Jan. 20, 1953     I. V. BRUMBAUGH     2,626,160
VALVE

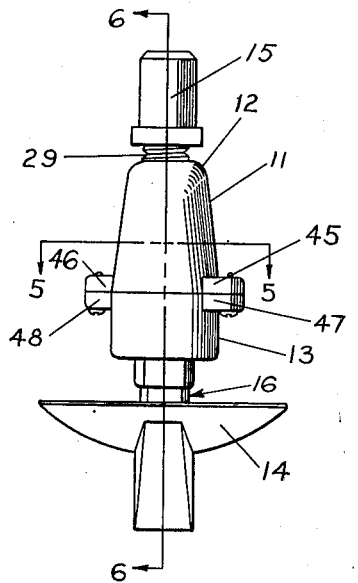
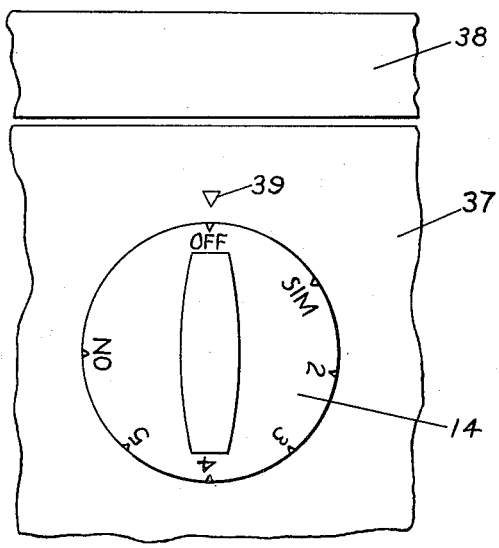
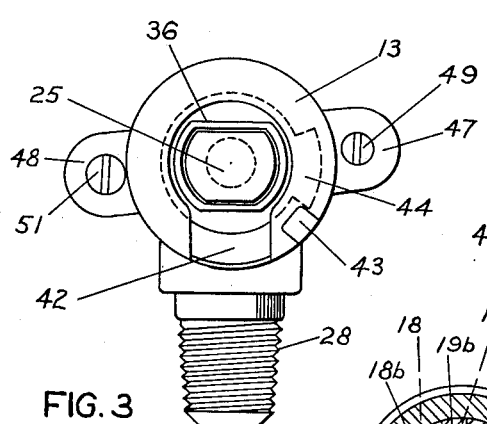
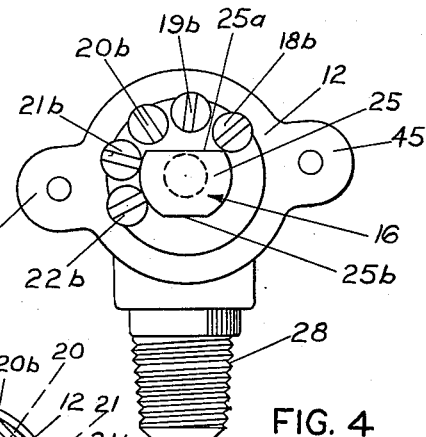
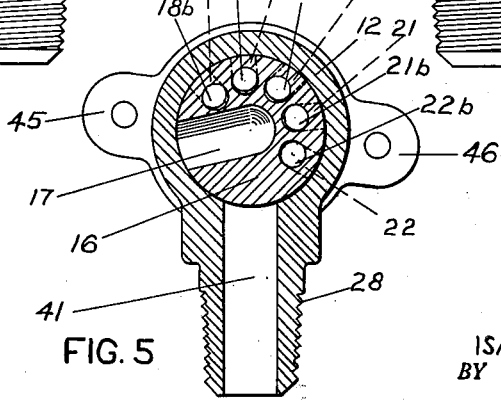

Filed Dec. 8, 1947     2 SHEETS—SHEET 2

INVENTOR.
ISAAC VERNON BRUMBAUGH
BY
Jerome R. Cox

Patented Jan. 20, 1953

2,626,160

UNITED STATES PATENT OFFICE 2,626,160

VALVE

Isaac Vernon Brumbaugh, Clayton, Mo.

Application December 8, 1947, Serial No. 790,356

6 Claims. (Cl. 277—64)

Nature of invention

The invention described in this application relates to valves. The valve disclosed and described herein in illustration of the invention is especially designed for use with a cooking top burner of a gas range and although my invention is useful for other purposes, it is particularly adapted for use in connection with such top cooking burners. Among other uses of valves constructed according to my invention and even of valves constructed according to the particular design shown herein, such multi-position valves can be used very advantageously for the control of the burners of gas ovens where an oven heat regulator has not been provided. Moreover such valves may be used for the control of other fluids than cooking gas in many other applications or uses.

Ordinarily valves for the control of the top burners of a gas cooking range consist of a casing having a single inlet opening and a single outlet opening and a plug having a single passage therethrough positioned within the casing and adapted at times to connect the inlet opening with the outlet opening. Adjustment or turn down of the flame is accomplished by partially closing these openings by the process of moving the ports in the plug slightly out of register with the ports in the casing. This type of adjustment requires the performance of a difficult operation by the housewife to get a low or simmer flame.

Objects

One object of my invention is to provide an improved valve mechanism having controllable gas control means whereby the valve is adapted to give selectively a relatively large number of types of flames of varying size and intensity, said valve mechanism being adapted to utilize various types of gas such as natural gas, manufactured gas, and liquid petroleum gases.

Another object of my invention is the provision of a valve of the type described in which there are relatively large numbers of definite, different sized flames selectively possible.

A further object of my invention is the provision of a multi-position valve which is very economical to manufacture, and, which, nevertheless, has a body and plug of standard relatively small size.

A further object of my invention is the provision of a valve having relatively few parts which is of inexpensive manufacture, easy assembly and sturdy design.

A further object of my invention is the provision of a gas cock of simple design, construction, and adjustment.

A further object of my invention is the provision of a gas cock valve having each metering position independently adjustable so that the valve can be adjusted with all kinds of gas for simmer, full "on" and various intermediate adjustments.

A feature of my invention is the provision of a valve having a casing and a plug member in which the plug member is formed with a main gas passage and with a plurality of metering ports, the metering ports being arranged in a plane different from the plane in which the main gas passage is positioned, thus obtaining a full gas passage at the "on" position and accomplishing closer spacing of the metering ports and metering screws.

Further objects and features of my invention will be apparent from the subjoined specification and claims when considered in connection with the accompanying drawings showing one embodiment of my invention which is shown and described merely for the purpose of illustration.

Drawings

In the drawings:

Figure 1 is a plan view of a valve constructed according to my invention;

Figure 2 is a view in front elevation of the valve of Fig. 1 shown associated with a fragment of a cooking range;

Figure 3 is a view in front elevation of the valve shown in Figs. 1 and 2 with the control knob removed;

Figure 4 is a view similar to Fig. 3 having the stop sleeve, cap, and spring also removed;

Figure 5 is a view in vertical section taken substantially on the line 5—5 of Fig. 1 looking in the direction of the arrows (i. e. the opposite direction to Figs. 2, 3 and 4);

Detailed description

Figure 6:
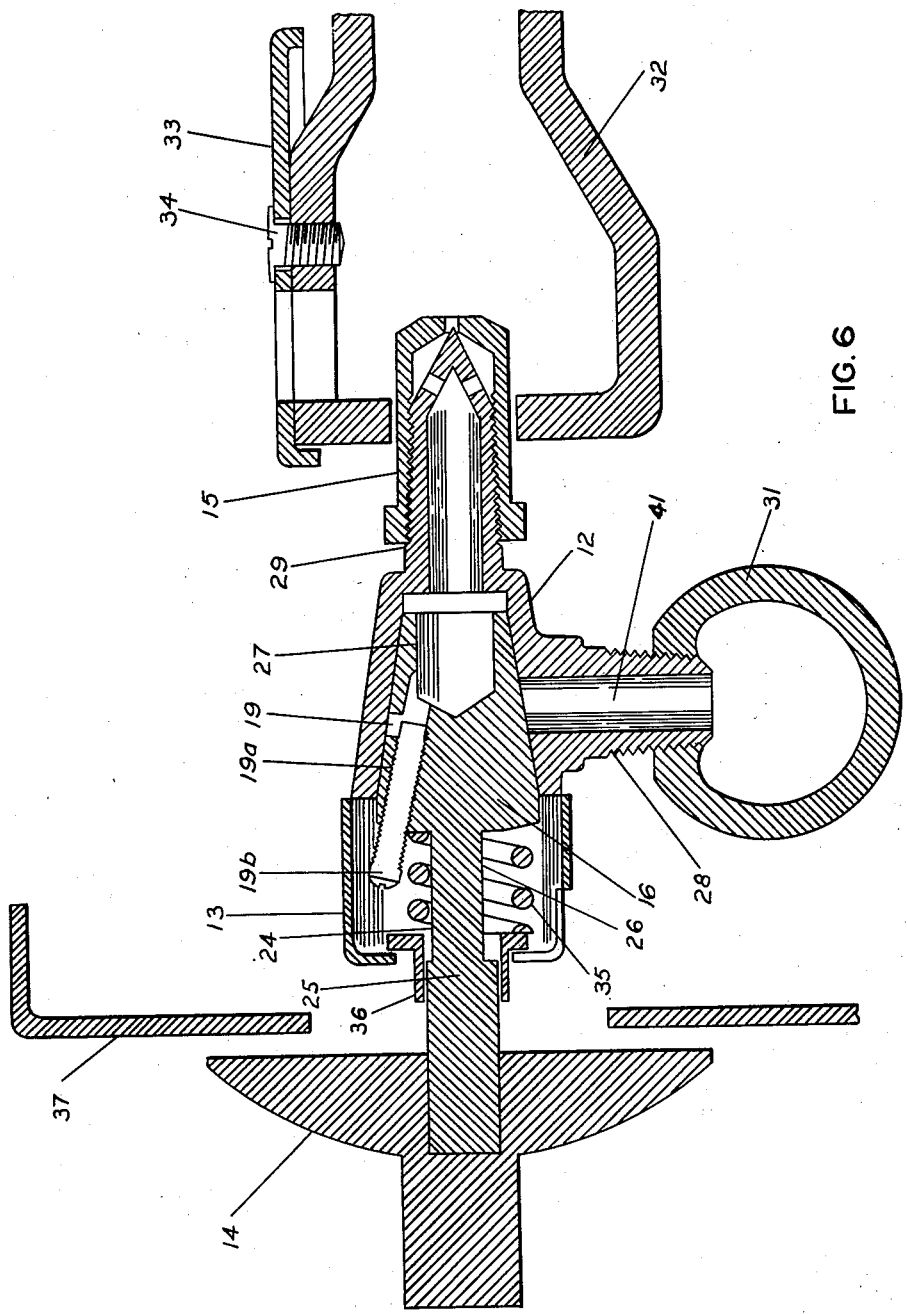
Figure 6 is a view in vertical section taken substantially on the line 6—6 of Fig. 1 and looking in the direction of the arrows.

Referring now again to the drawings and especially to Fig. 1 for a detailed description of the selected embodiment of my invention, I have shown a valve 11 comprising a main casing member 12, a spring cap 13, a control knob 14, and an orifice cap 15. Within the casing 12 and the spring cap 13 there is positioned a plug member 16, a portion of which is shown in Fig. 1 but which is illustrated more clearly probably in Figs. 5 and 6. The plug 16 is formed with the main gas passage 17 and a plurality of metering ports 18, 19, 20, 21, and 22. It is also formed (Fig. 6) with a stem 24 having an end portion 25 (see Fig. 4), with flattened faces 25ª and 25ᵇ on opposite sides thereof, the flat 25ᵇ being smaller than the flat 25ª to prevent improper assembly. The stem 24 has a reduced inner round section at 26 for purposes later discussed. The plug 16 as may be seen most clearly in Fig. 6 is tapered and is formed with a concentric forward recess 27 through which gas flows to the associated cooking burner. Associated with each of the metering ports is an inclined tapped bore intersecting with the associated metering port and extending into the recess 27. Thus the inclined bore 19ª intersects with the port 19. Associated with each of the inclined tapped bores is a metering screw all of which are like the metering screw 19ᵇ shown in Fig. 6. The heads of metering screws 18ᵇ, 19ᵇ, 20ᵇ, 21ᵇ and 22ᵇ are shown in Fig. 4.

The casing 12 is formed with an inlet boss 28 (Figs. 3, 4, 5 and 6) and with a nozzle extension 29 (Fig. 6). As is shown most clearly in Fig. 6, the boss 28 is adapted to be threaded into an intake gas manifold 31 and the nozzle 29 together with the orifice cap 15 extends into the front end of a mixing tube 32 which is arranged to be associated with and lead into a top cooking gas burner of a gas range. The boss 28 is formed with a central bore 41 which forms the gas inlet port for the valve. The center of this inlet port is aligned with the center of the main gas passage 17 so that when the valve is turned to the "on" position, the inlet port 41 and the gas passage 17 completely coincide to allow full and complete gas flow through the valve. However, the metering ports 18, 19, 20, 21, and 22 are all positioned rearwardly of the vertical plane perpendicular to the axis of the plug which passes through the aligned centers of the port 41 and passage 17. Thus though the metering ports 18, 19, 20, 21, and 22 may be aligned with the rear (smaller) portion of the inlet port 41, I am able to space the metering ports much closer together than if they were positioned to coincide with the center (wider) portion of the inlet port 41, while at the same time leaving a much wider margin of safety so that the operator does not have to be so careful that the valve is accurately positioned. Thus I am able to have many more metering ports than would be otherwise possible.

By reference to Figures 2 and 5 it may be seen that definite positions of the valve are provided so that each of the ports 18, 19, 20, 21, and 22 may be separately utilized. When the valve is so correctly positioned the inlet port 41 is correctly aligned with one of the metering ports 18, 19, 20, 21, or 22 but does not overlap any other metering ports. As the plug is turned toward the next position the metering port which was so aligned does not completely pass out of registration with the inlet port 41 until the next metering port is partly aligned therewith. Thus the flame is never extinguished between positions.

As is shown in Fig. 6, the mixing tube 32 is provided with a primary air adjusting plate 33, held in adjusted position by a screw 34. The tapered plug 16 is held firmly in gas tight relationship with the casing 12 by means of a spring 35 which bears at its forward end on a stop sleeve 36 positioned within the forward end of the spring cap 13. It may be pointed out here that the spring 35 should be of adequate size to hold the plug in place; it should surround the stem 24; it must be positioned within the metering screws (e. g. 19ᵇ) and it should rest on the stop sleeve 36 which turns with the plug. The stop sleeve 36 is shaped to conform to the flattened portion 25 of the stem 24. Thus I have contrived to position the spring 35 eccentrically of the plug as shown in Fig. 6 and have reduced the size of the stem 24 at 26 for the purpose of accommodating the spring. It should be noted that while the flattened faces 25ª and 25ᵇ of the end portion 25 are slightly eccentric of the stem 24, the reduced portion 26 is concentric of the plug.

As stated, the valve is shown (in Figs. 2 and 6) associated with the panel 37 of the cooking range, a fragment of the cooking top frame 38 being also shown in Fig. 2. The knob 14 is provided with indicia such as "off," "sim," 2, 3, 4, 5, and "on" to indicate by cooperation with a pointer 39, the position of the valve. The order of the indicia and the corresponding ports of the valve may be altered in any desired manner. For instance, it is obvious that the knob 14 could be designed to rotate in a clockwise direction from "off" to "on" to "simmer," 2, 3, 4, and 5 or substantially in any other desired order. In all of the views the valve is shown in the "off" position but the valve 14 may be turned in a counterclockwise direction to position the valve so that the main passage 17 or any of the metering ports 18, 19, 20, 21 or 22 are aligned with the bore 41 (Fig. 5 and Fig. 6) of the inlet boss 28.

Referring now to Fig. 3 it may be seen that the spring cap 13 is provided with a notch 42 through which access may be obtained at times, to the screws 18ᵇ, 19ᵇ, 20ᵇ, 21ᵇ, 22ᵇ so that they may be adjusted without removal of the spring cap 13. It will also be noted that when the valve is turned to register one of the metering ports with the bore 41, then the screw (which is associated with the metering port then registering with the inlet passage 41) will be positioned in front of the notch 42 so that the adjustment may be made at the same time that the flame can be observed. At such time no other screw may be adjusted. It should also be noted that the spring cap 13 is indented as at 43 to provide a stop and that the stop sleeve 36 is provided with an extension 44 which is adapted, at times, to contact the stop 43 to fix the extreme limits of rotation of the valve in either direction. Obviously where the direction of rotation of the valve is changed as suggested above or the indicia on the knob and adjustment of the metering screws are changed, the position of the stops may be changed as may be desirable.

The casing 12 is provided with extending ears 45 and 46 and the spring cap 13 is provided with ears 47 and 48. A relatively small screw 49 secures the ears 45 and 47 to each other and a relatively large screw 51 secures the ears 46 and 48 to each other, the tapped bores in the respective ears being of suitable size so that improper assembly becomes impossible.

*Operation*

In the operation of a valve 11 constructed as described above in accordance with my invention, the valve 11 is assembled with the gas manifold 31 and mixing tube 32 of a gas range so that the stem 24 extends through an opening in the panel 37 of the range. The knob 14, which is placed on the stem 24 outside of the panel 37, is then turned so that the valve is set in the full "on" position (i. e. the indication "on" on the dial is brought into registration with the pointer 39). The orifice cap 15 is adjusted on the nozzle extension 29 to allow the passage of the proper amount of gas for the type of burner used (about 9000 B. t. u. per hour for a regular burner and 12,000 B. t. u. per hour for a giant burner). Then the air shutter 33 is adjusted on the mixing tube 32 to obtain the proper type of flame for most efficient operation. The knob 14 is then turned to set the valve at the "simmer" position. The "simmer" metering screw 22$^b$ is thus brought in registration with the opening 42 and is adjusted until a correct simmer flame (about 1500 B. t. u. per hour for a regular burner and about 2000 B. t. u. per hour for a giant burner). Then the knob is turned separately to each of the intermediate positions and the other metering screws are similarly adjusted to provide corresponding larger but intermediate flames.

Thus in the "off" position as shown in the drawings (see especially Figs. 5 and 6) no gas can flow from the manifold 31 into the valve. If the valve plug is turned counterclockwise to the "on" position a full flow of gas flows from the passage 41, through the main port 17, the recess 27 in the hollow plug 16, the hollow casing 12, the hollow nozzle 29, the orifice cap 15 and the mixing tube 32. Here it is mixed with air and flows to the burner. In this open position of the valve, the gas is automatically lighted, where flash tube lighting is provided, or may be lighted in any other convenient manner. The valve may be left in such position to secure a maximum flame or may then be turned clockwise to the "simmer" position or to any intermediate position to secure any other desired flame.

It is to be understood that the above described embodiment of my invention is for the purpose of illustration only and various changes may be made therein without departing from the spirit and scope of my invention as defined in the appended claims.

I claim:

1. A rotor valve plug for use with a casing having an inlet port and an outlet port, said plug comprising a frusto conical rotor plug having a relatively large outlet bore formed as a discharge recess in one end thereof and forming a hollow therein, said plug also having a main gas passage formed as a cross bore and leading substantially radially from the discharge recess to the circumferential surface of the plug substantially at a point on said surface which is in a plane cutting said plug perpendicularly to the longitudinal axis of the plug and passing through said inlet port, said plug being also formed with a plurality of separate substantially longitudinally extending bores each of which is comparatively small relative to said discharge recess, each of which bores is spaced from the longitudinal axis of the plug, and each of which bores is connected to said discharge recess and leads substantially longitudinally of the plug to the end opposite said recess, and said plug being also formed with a plurality of separate radial bores, each said radial bore leading from one of said longitudinal bores substantially radially outward to a point on the circumferential surface of the plug which is in a plane cutting said plug perpendicularly to the longitudinal axis of the plug and passing through said inlet port, and said longitudinal bores being provided with screws blocking a portion thereof which is toward the end of the plug opposite to said recess.

2. A rotor valve plug structure for use with a casing having an inlet port and an outlet port, said plug comprising a frusto conical rotor plug having a relatively large outlet bore formed as a recess in the rear end of the plug and forming a hollow in the plug, said plug being also formed with a larger surface at its forward end than at its rearward end, said plug being also provided with means for rotating the plug, said rotating means extending forward from said larger surface, said plug being also formed with a main gas passage comprising a cross bore which leads substantially radially from said discharge recess to the circumferential surface of the plug substantially at a point on said surface which is in a plane cutting said plug perpendicularly to the longitudinal axis of the plug and passing through said inlet port, said plug being also formed with a separate longitudinal bore which is of small diameter relative to said outlet bore and cross bore and said bore being spaced from the axis of the plug but being connected to said discharge recess and leading substantially longitudinally of the plug to the forward larger surface thereof, and said plug being also formed with a radial bore connected to said longitudinal bore and leading substantially radially to the circumferential surface of the plug substantially at a point on said surface which is in a plane cutting said plug perpendicularly to the longitudinal axis of the plug and passing through said inlet port.

3. A valve comprising a casing formed with a forward tapered recess and having an inlet port and an outlet port; a spring retaining member attached to said casing to form, together with said recess, a retaining chamber for a plug and a spring; a rotative valve plug formed with a rearward positioned outlet bore and with a longitudinal bore which is spaced from the rotative axis of said plug and which is connected to said outlet bore of the plug but has a relatively small diameter relative to said outlet bore, also formed with a radial passage which is connected to said longitudinal bore, and positioned within said chamber and seated in said tapered recess; a spring also positioned in said chamber and interposed between the plug and the spring retaining member; and an adjustment screw in said longitudinal bore having its forward end positioned wholly in said chamber radially outward from the axis of said plug.

4. A valve comprising a casing having an inlet port and an outlet port; a rotor plug therein formed at its rearward end with a relatively large outlet bore, formed also with a relatively small radial bore leading substantially radially from the circumferential surface of the plug where it is at times connected with the inlet port, and formed with a relatively small longitudinally extending bore extending substantially longitudinally of said plug and spaced from the rotative axis of the plug but connected to said outlet bore and intersecting said radial bore and forming a gas passage with said outlet bore and said radial bore; means comprising an adjustable screw positioned in said longitudinal bore for selectively constricting the size of said gas passage; and a spring retaining cover for the forward end of said casing having a substantially imperforate annular portion in line with the rotative positions of the forward end of said screw which annular portion has a part cut out substantially in line with said inlet port whereby the screw becomes aligned with said cut out part and may be adjusted when and only when the radial bore is aligned with the inlet port.

5. A valve comprising a casing having an inlet port and an outlet port; a rotor plug therein formed with a relatively large outlet bore comprising a discharge recess and connected at all times with said outlet port, formed with a longitudinal bore having a relatively small diameter as compared with said outlet bore and spaced from the axis of the plug but connected to the recess and leading to the end of the plug opposite to the recess, and formed with a radial bore connected with said longitudinal bore and leading to the circumferential surface of the plug and there at times connected with said inlet port, said plug being provided with a forwardly extending stem having a cross section less than the cross section of said plug; a metering screw positioned in said longitudinal bore and extending forward from said plug and positioned radially outside of said stem; a cap secured to said casing and surrounding said screw; a stop member rotatable with said stem and bearing on said cap; and a coil spring bearing on said plug at one end and on said stop member at the other end, surrounding said stem and contacting the forwardly extending portion of said screw and positioned nearer to the axis of rotation of said plug than the forwardly extending head of said metering screw, whereby the spring is positioned by said plug, said stem, said screw, and said rotatable stop member.

6. A valve comprising a casing having a recess, having an inlet port and having an outlet port at the rear end which is connected to said recess; a spring retaining member attached to the forward end of said casing and together with said recess forming a chamber; a valve plug seated in the chamber, formed with a forward face which is also located in said chamber, and formed with an outlet bore at the rearward end thereof and an eccentric longitudinal bore having a relatively small diameter relative to said outlet bore which at its forward end terminates at the forward face of said plug and at its rearward end terminates in said outlet bore and which has a radial passage connected thereto; means for turning said plug, connected to said plug and extending forwardly from the face of said plug and forwardly through said spring retaining member to a point forwardly of and outside of said chamber; a spring in said chamber interposed between said forward face of the plug and said spring retaining member; and an adjustment screw secured in said longitudinal bore and having its forward end positioned in said chamber.

ISAAC VERNON BRUMBAUGH.

REFERENCES CITED

The following references are of record in the file of this patent:

UNITED STATES PATENTS

| Number | Name | Date |
|---|---|---|
| 2,161,523 | Moecker | June 6, 1939 |
| 2,224,566 | Jaros | Dec. 10, 1940 |
| 2,257,886 | Mueller | Oct. 7, 1941 |
| 2,284,995 | Stuckenholt | June 2, 1942 |